United States Patent [19]
Yamada et al.

[11] Patent Number: 5,638,194
[45] Date of Patent: Jun. 10, 1997

[54] POLYMER DISPERSED FERROELECTRIC LIQUID CRYSTAL DISPLAY DEVICE AND A METHOD FOR PRODUCING THE SAME

[75] Inventors: Nobuaki Yamada, Higashiosaka; Tomoaki Kuratate; Shuichi Kohzaki, both of Nara, all of Japan

[73] Assignee: Sharp Kabushiki Kaisha, Osaka, Japan

[21] Appl. No.: 168,986

[22] Filed: Dec. 16, 1993

[30] Foreign Application Priority Data

Dec. 17, 1992 [JP] Japan ................... 4-337648

[51] Int. Cl.⁶ ............... G02F 1/1333; G02F 1/1339
[52] U.S. Cl. ................. 349/86; 349/156; 349/171; 349/93
[58] Field of Search ................ 359/51, 52, 56, 359/81

[56] References Cited

U.S. PATENT DOCUMENTS

| | | | |
|---|---|---|---|
| 5,034,153 | 7/1991 | Uchida et al. | 359/104 |
| 5,300,254 | 4/1994 | Geelhaar et al. | 252/299.61 |
| 5,321,533 | 6/1994 | Kumar | 359/51 |
| 5,333,074 | 7/1994 | Hikmet | 359/51 |
| 5,372,745 | 12/1994 | Yoshinaga et al. | 252/299.01 |

FOREIGN PATENT DOCUMENTS

| | | |
|---|---|---|
| 278721 | 8/1988 | European Pat. Off. |
| 58-501631 | 9/1983 | Japan |
| 61-502128 | 9/1986 | Japan |
| 62-277412 | 12/1987 | Japan |
| 63-109419 | 5/1988 | Japan |
| 63-109418 | 5/1988 | Japan |
| 63-216027 | 9/1988 | Japan |
| 63-264629 | 11/1988 | Japan |
| 63-280742 | 11/1988 | Japan |
| 63-264724 | 11/1988 | Japan |
| 63-264723 | 11/1988 | Japan |
| 63-264721 | 11/1988 | Japan |
| 63-264722 | 11/1988 | Japan |
| 63-318526 | 12/1988 | Japan |
| 1-269922 | 10/1989 | Japan |
| 3-72317 | 3/1991 | Japan |
| 3-192334 | 8/1991 | Japan |
| 3-221919 | 9/1991 | Japan |
| 4-59890 | 2/1992 | Japan |
| 4-56920 | 2/1992 | Japan |
| 4-143723 | 5/1992 | Japan |
| 4-218024 | 8/1992 | Japan |
| 4-251220 | 9/1992 | Japan |
| 4-281425 | 10/1992 | Japan |
| WO83/01016 | 3/1983 | WIPO |
| WO85/04262 | 9/1985 | WIPO |

*Primary Examiner*—William L. Sikes
*Assistant Examiner*—Charles Miller
*Attorney, Agent, or Firm*—David G. Conlin; John L. Welch

[57] ABSTRACT

A ferroelectric liquid crystal display device according to the present invention includes: a pair of substrates disposed so as to oppose each other, at least one of the pair of substrates being transparent; electrodes formed on an inside face of each of the pair of substrates; and a display medium for displaying an image, the display medium being divided into at least one liquid crystal region composed essentially of ferroelectric liquid crystal and a polymer region composed essentially of liquid crystalline polymer, and the display medium being controlled by applying a voltage to the electrodes.

6 Claims, 2 Drawing Sheets

POLYMER DISPERSED FERROELECTRIC LIQUID CRYSTAL DISPLAY DEVICE AND A METHOD FOR PRODUCING THE SAME

BACKGROUND OF THE INVENTION

1. Field of the Invention

The present invention relates to a liquid crystal display device for displaying an image and a method for production thereof. A liquid crystal display device according to the present invention is applicable to a flat display device such as a liquid crystal panel to be used in a projection television, a personal computer, and, in view of a shutter effect thereof in particular, a display board, a window, a door, a wall, and the like. In particular, the liquid crystal display device according to the present invention is applicable to a device in which a thin substrate or a film substrate is used.

2. Description of the Related Art

As display devices utilizing liquid crystal, there have been realized display devices of a TN (Twisted Nematic) mode or an STN (Super Twisted Nematic) mode, which utilize electrooptical effects of nematic liquid crystal. There have also been proposed ferroelectric liquid crystal display devices, in which ferroelectric liquid crystal (FLC) is used, as display devices with higher potentials than the above-mentioned display devices. A ferroelectric liquid crystal display device has such properties as rapid response and memory functions, which a nematic liquid crystal display device does not have. Therefore, ferroelectric display devices are drawing attention, especially as high-resolution liquid crystal display devices and as large area liquid crystal display devices.

However, a ferroelectric liquid crystal display device utilizes, for electrooptical switching, spontaneous polarization occurring at a smectic C* phase (SmC* phase), at which the liquid crystal is closer to being a crystal than at the nematic phase, a phase which is used in nematic liquid crystal display devices. Therefore, ferroelectric liquid crystal display devices have the problem of poor shock resistance because of the regular crystal structure of the smectic C* phase. It is also difficult, in a ferroelectric liquid crystal display device, to uniformly align liquid crystal molecules over a large display. Moreover, since switching is conducted only between two states, i.e. states before and after switching of the spontaneous polarization, there is a problem that no transition state can be obtained. This makes any gray scale display difficult.

A method disclosed in Japanese Laid-Open Patent Publication No. 63-264724 aims to solve the above-mentioned problem of poor shock resistance. According to this method, ferroelectric liquid crystal is dispersed in a polymer, a resultant film being subjected to a stretching process. Japanese Laid-Open Patent Publication No. 63-318526 discloses a flexible ferroelectric liquid crystal display device which has high shock resistance. A ferroelectric liquid crystalline polymer in which a ferroelectric liquid crystal compound is fixed to a side chain of a polymer is used in the display device.

However, the above-mentioned polymer dispersed ferroelectric liquid crystal display device, although having improved shock resistance, has a problem that light scatters at the interfaces between the ferroelectric liquid crystal and the polymer owing to the difference in the refractive indexes thereof. As a result, polarized incident light is depolarized, thereby decreasing the contrast of the display device.

On the other hand, the above-mentioned flexible ferroelectric liquid crystal display device in which a ferroelectric liquid crystal compound is fixed to a side chain of a polymer, has a problem that the response speed thereof is slower by two digits, or two orders of magnitude, than that of ferroelectric liquid crystal itself, since liquid crystal molecules are combined with polymer chains in the display device.

Improvement of the response speed of such a ferroelectric liquid crystal display device is achieved by a method disclosed in Japanese Laid-Open Patent Publication No. 4-59890. The method uses a ferroelectric liquid crystalline polymer added with a low molecular weight ferroelectric liquid crystal having a high response speed. However, the method has a problem that properties of the low molecular weight ferroelectric liquid crystal become more dominant as the content of the low molecular weight ferroelectric liquid crystal increases, thereby lowering the shock resistance of the display device.

With a view to achieving displaying in gray scales, there have been proposed an area-based gray scale method, in which gray scales are displayed by lowering the resolution of the display, and a time-sequential gray scale method, in which gray scales are displayed by lowering the frame frequency of the display device. However, in both methods, each pixel is merely displaying either of the two states of white and black instead of actually displaying in gray scales.

SUMMARY OF THE INVENTION

A ferroelectric liquid crystal display device according to the present invention comprises: a pair of substrates disposed so as to oppose each other, at least one of the pair of substrates being transparent; electrodes formed on an inside face of each of the pair of substrates; and a display medium for displaying an image, the display medium being divided into at least one liquid crystal region composed essentially of ferroelectric liquid crystal and a polymer region composed essentially of liquid crystalline polymer, and the display medium being controlled by applying a voltage to the electrodes.

In one embodiment of the invention, the ferroelectric liquid crystal display device further comprises a plurality of pixels, wherein the at least one liquid crystal region is formed corresponding to the pixels.

In another embodiment of the invention, the at least one liquid crystal region is, in a portion thereof, in contact with at least one of the pair of substrates.

In still another embodiment of the invention, a longest liquid crystal region diameter, in a plane parallel to the pair of substrates, is larger than a distance (interspace) between the pair of substrates.

In still another embodiment of the invention, the liquid crystalline polymer includes at least one ferroelectric liquid crystal polymer unit.

In still another embodiment of the invention, a component ratio between ferroelectric liquid crystal and ferroelectric liquid crystalline polymer gradually changes in the vicinity of an interface between the at least one liquid crystal region and the polymer region, the component ratio changing in a direction parallel to the pair of substrates.

In still another embodiment of the invention, an aligning film is provided on the electrodes.

In still another embodiment of the invention, a polarizer is provided on an outside face of each substrate.

In still another embodiment of the invention, the ferroelectric liquid crystal contains a multichroic dye.

In still another embodiment of the invention, the ferroelectric liquid crystal contains a multichroic dye, and wherein a polarizer is provided on an outside face of one of the substrates.

A method for producing a ferroelectric liquid crystal display device according to the present invention comprises the steps of: forming electrodes on each of a pair of substrates, at least one of the pair of substrates being transparent; forming an aligning film on the electrodes formed on at least one of the pair of substrates; subjecting the aligning film to a rubbing treatment; disposing the pair of substrates in such a way that the electrodes formed on one of the pair of substrates oppose the electrodes formed on the other substrate, a space being interposed between the pair of substrates; disposing light regulating means for modulating light intensity on the pair of substrates in such a way that portions of the pair of substrates which later become display pixels are shaded by the light regulating means; injecting a mixture of a polymer precursor having a photopolymerizable functional group and ferroelectric liquid crystal having no photopolymerizable functional group; irradiating the pair of substrates with a UV-ray through the light regulating means; and removing the light regulating means.

In one embodiment of the invention, the irradiation with a UV-ray is conducted for all of the display pixels in such a way that the intensity of the UV-ray is decreased in a portion of each display pixel accounting for at least 10% or more of the area of each display pixel and that the intensity of the UV-ray is decreased by 50% or more in at least a portion of the portion of the display pixel accounting for at least 10% or more of each display pixel.

In another embodiment of the invention, the light regulating means is a photomask having a regular pattern for shading at least 10% or more of the area of each display pixel, and wherein the irradiation with a UV-ray is conducted through the photomask.

In still another embodiment of the invention, the photomask is formed in an integral manner with one of the pair of substrates and the irradiation with a UV-ray is conducted through the photomask.

Alternatively, a method for producing a ferroelectric liquid crystal display device according to the present invention comprises the steps of: forming electrodes on each of a pair of substrates, at least one of the pair of substrates being transparent; forming an aligning film on the electrodes formed on at least one of the pair of substrates; subjecting the aligning film to a rubbing treatment; patterning a heat-polymerization initiator on at least one of the pair of substrates; disposing the pair of substrates in such a way that the electrodes formed on one of the substrates oppose the electrodes formed on the other substrate, a space being interposed between the pair of substrates; injecting a mixture of a polymer precursor having a thermosetting functional group and ferroelectric liquid crystal having no thermosetting functional group; and curing the ferroelectric liquid crystal having the thermosetting functional group by heating the pair of substrates.

Thus, the invention described herein makes possible the advantages of: (1) providing a ferroelectric liquid crystal display device capable of displaying with high contrast and having high shock resistance while maintaining a high response speed as one property inherent to ferroelectric liquid crystal, and a method for production thereof; and (2) providing a ferroelectric liquid crystal display device which is, in addition to the above, further capable of displaying in gray scales, and a method for production thereof.

These and other advantages of the present invention will become apparent to those skilled in the art upon reading and understanding the following detailed description with reference to the accompanying figures.

DESCRIPTION OF THE PREFERRED
EMBODIMENTS

Hereinafter, the present invention will be described in detail.

A liquid crystal display device according to the present invention includes a pair of substrates disposed so as to oppose each other and a display medium interposed between the pair of substrates. At least one of the substrates is transparent. The display medium is a so-called polymer dispersed liquid crystal which consists essentially of liquid crystal regions and a polymer region. Electrodes are formed on the inside face of each substrate. The display state of the display medium is controlled by applying a voltage to the electrodes.

More specifically, the display device of the present invention is such that the ferroelectric liquid crystal regions thereof are partitioned by walls of the polymer. This configuration does not unfavorably affect the response speed of the ferroelectric liquid crystal regions, which serve as displaying portions. Moreover, the shock resistance of the display device is secured by the presence of the polymer walls. Therefore, the liquid crystal display device of the present invention has both high shock resistance and a high response speed, unlike ferroelectric liquid crystal display devices whose display device is composed only of ferroelectric liquid crystal.

Preferably, at least some of the liquid crystal regions are in contact with, in a portion thereof, a face of at least one of the substrates which is subjected to an orientation treatment. Thus, it becomes possible to align the ferroelectric liquid crystal in accordance with an orientation given to that face of the substrate(s). More preferably, the longest liquid crystal region diameter (that is, the longest diameter of each liquid crystal region) in a plane parallel to the substrates should be larger than the distance (interspace) between the substrates. By thus forming the liquid crystal areas larger than those in a conventional polymer dispersed liquid crystal display device, the total area of the interfaces between the liquid crystal and the polymer is reduced. As a result, light scattering at the interfaces between the liquid crystal and the polymer is reduced, whereby decrease in contrast is minimized. Thus, the display device can have high contrast and high display characteristics as well as high response speed and high shock resistance.

A display device having the above-mentioned configuration can be fabricated by a fabrication method for a polymer dispersed liquid crystal display device. Japanese National Publication No. 61-502128, for example, discloses a method in which liquid crystal is mixed with a photosetting or thermosetting resin, and the resin is cured so as to allow the liquid crystal to deposit, whereby liquid crystal droplets are formed within the resin. Japanese Laid-Open Patent Publication No. 3-72317 discloses a method for controlling the diameters of such liquid crystal droplets.

However, the method disclosed in Japanese Laid-Open Patent Publication No. 3-72317 has difficulty in controlling the diameter of each liquid crystal droplet with high accuracy and in disposing the liquid crystal accurately in a substantially single plane, since it utilizes phase separation of liquid crystal and polymer (resin). Therefore, the present invention, while the above-mentioned known methods are applied thereto, features the method described below, in order to dispose uniformly formed liquid crystal droplets in a substantially single plane:

A mixture of ferroelectric liquid crystal and a ferroelectric liquid crystal prepolymer (polymer precursor) in which a photosetting functional group is combined with a portion of ferroelectric liquid crystal is disposed within a cell composed of a pair of substrates. The mixture is irradiated with UV-rays (Ultra Violet rays) so that the ferroelectric liquid crystal prepolymer is cured to form a ferroelectric liquid crystalline polymer. (Herein, 'a ferroelectric liquid crystal polymer' is defined as a liquid crystal polymer including at least one ferroelectric liquid crystal polymer unit.) Thus, polymer dispersed liquid crystal is obtained. The UV-rays used in the irradiation of the mixture are ensured to have regular intensities of high and low corresponding to a desired distribution of liquid crystal droplets. As a result, the functional group contained in the ferroelectric liquid crystal prepolymer is photopolymerized in accordance with a predetermined pattern. In portions of the mixture where UV-rays are radiated at a high intensity (hereinafter, such portions will be referred to as "strongly-irradiated portions"), polymerization occurs rapidly as compared with portions of the mixture where UV-rays are radiated at a low intensity (hereinafter, such portions will be referred to as "weakly-irradiated portions"). That is, the phase separation rate of the liquid crystal and the polymer is high in the strongly-irradiated portions. As a result, the polymer deposits first, so as to thrust the ferroelectric liquid crystal to the weakly irradiated portions, where ferroelectric liquid crystal droplets form. Thus, it is made possible to dispose uniformly formed ferroelectric liquid crystal droplets in a plane in accordance with a predetermined pattern. In view of the above, it is required that the intensity of the UV-rays is decreased by 50% or more in at least a portion of each weakly-irradiated portion.

As may be seen, in the method of the present invention, it is important how to obtain a desired distribution of intensities of UV-rays. A light regulator for modulating the intensity of UV-rays, such as a photomask, a microlens, or an interfering plate can suitably be used to partially interrupt the UV-rays or to effect interference, whereby the desired distribution of UV-ray intensities is obtained. In cases where a photomask is used, the photomask may be provided on either the inside or outside of the cell, as long as a predetermined distribution of UV-ray intensities is obtained. In cases where the photomask is disposed on the outside of the cell, the photomask should preferably be as close to the mixture of the prepolymer and the liquid crystal as possible. If the distance between the substrate and the photomask is made large, a portion of the mixture that is actually irradiated with the UV-ray is blurred, whereby the effect of disposing uniformly formed droplets in a plane is reduced. The light regulator may be formed in an integral manner with one of the substrates during fabrication of the substrates.

Since polymer walls are formed of a liquid crystal prepolymer having a photosetting functional group (which is not confined to a ferroelectric liquid crystal prepolymer) as is described above, the contrast of the liquid crystal display device is improved, as is described below:

In cases where the polymer walls are composed of a material whose molecules cannot be aligned in accordance with an orientation of liquid crystal molecules in the liquid crystal regions (whose orientation is determined by an orientation given to a surface of the substrate(s)), liquid crystal molecules disposed on the surface of the polymer walls are inevitably in a random orientation state. In other words, regions having different orientations than that given to the surface of the substrate may appear in the vicinity of boundaries between the liquid crystal regions and the polymer walls. Such regions having different orientations from that of the substrate may have different switching characteristics than the other regions. In the regions having different orientations from that of the substrate, moreover, when a pair of polarizers are disposed in a cross-Nicol state, complete extinction of light cannot be attained, that is, part of the light leaks out without being interrupted by the polarizers. A display device having such polymer walls can only have poor display characteristics, due to the decrease in the contrast thereof.

On the contrary, in cases where the polymer walls are formed of a photosetting liquid crystal prepolymer, as in the case of the present invention, the whole mixture (including liquid crystal material which is not photopolymerizable) has an orientation in accordance with that given to the substrate before photopolymerization occurs. The orientation of the whole mixture is also maintained after the photopolymerization. More specifically, portions of a resultant polymer at which no photosetting functional groups are combined retain the orientation before the photopolymerization. Therefore, no random orientation state occurs in the vicinity of the boundaries between the liquid crystal regions and the liquid crystalline polymer walls, whereby the contrast of the display device is improved, resulting in better display characteristics.

Moreover, a display device according to the present invention can conduct display in gray scales by using a ferroelectric liquid crystalline polymer as a material for the polymer walls. Principles behind this will be described below:

The following phenomena are observed in a photopolymerization process through which the polymer walls are formed: In weakly-irradiated portions, an amount of polymer is generated during the photopolymerization even where no light is radiated. At least one of the following is true nearer a strongly-irradiated portion: a larger amount of such polymer is generated; the degree of polymerization is higher. In strongly-irradiated portions, on the other hand, liquid crystal which has emerged through phase-separation during the photopolymerization is present with an ununiform distribution. As a result, the component ratio between the ferroelectric liquid crystal and the ferroelectric liquid crystalline polymer gradually changes in the vicinity of interfaces between low molecular weight ferroelectric liquid crystal regions (which correspond to the weakly-irradiated portions) and the ferroelectric liquid crystal polymer walls (which correspond to the strongly-irradiated portions). The content of the liquid crystal becomes larger nearer the center of a weakly-irradiated portion. As a result of such a gradual change in the component ratio between the ferroelectric liquid crystal and the ferroelectric liquid crystal polymer, the threshold value of the cell's electrooptical switching when a voltage is applied to the display device in actual operation gradually changes within a pixel (which corresponds to a weakly-irradiated portion). This change in the threshold value is presumed to be caused by division of the applied voltage between the polymer and the low molecular weight liquid crystal which occurs in accordance with the component ratio therebetween.

The inventors of the present invention assume two reasons for the generation of the polymer in portions where no light is radiated (hereinafter referred to as "non-irradiated portions"):

The first assumption is that a radical generated in portions where light is radiated (hereinafter referred to as "irradiated portions") diffuses so that polymerization, though slowly, takes place in the non-irradiated portions. The second assumption is that the polymer generated in the irradiated portions diffuses throughout the liquid crystal cell so as to pervade the non-irradiated portions. More specifically, such diffusion of the polymer generated in the irradiated portions results in a distribution of polymerization degrees gradually decreasing away from the irradiated portions. This is explained by the following: In the irradiated portions, as is well-known, a multitude of polymerization degrees are present. Since the polymerization degree is in direct proportion to the viscosity, which is in inverse proportion to the diffusion rate of the polymer, a multitude of diffusion rates results; the multitude of diffusion rates leads to a two-dimensional distribution in diffusion of the polymer which is in accordance with the distribution of polymerization degrees.

As for causes for the ununiform distribution of low molecular weight liquid crystal in irradiated portions, it is presumable that components of light interfere with one another in the irradiated-portions.

As is described above, the switching threshold value gradually changes within each pixel. Accordingly, by varying the voltage to be applied, areas of each pixel which switch corresponding to the voltage can be gradually varied in size. In other words, display in gray scales is realized.

As has been described, displaying in gray scales requires that the component ratio between the ferroelectric liquid crystal and the ferroelectric liquid crystalline polymer gradually changes within each pixel. Methods to secure this gradual change in the component ratio are: to gradually change the degree at which the light regulator (such as a photomask) interrupts light along a direction in which an electrode is formed, starting from an edge of the photomask, etc; to deliberately dispose the light regulator at a small distance from the cell; to use a light source which emits light with a slightly poor degree of parallelism; and so on.

Examples of such a photomask for gradually changing the degree of light interruption will be described.

Figure 1A:
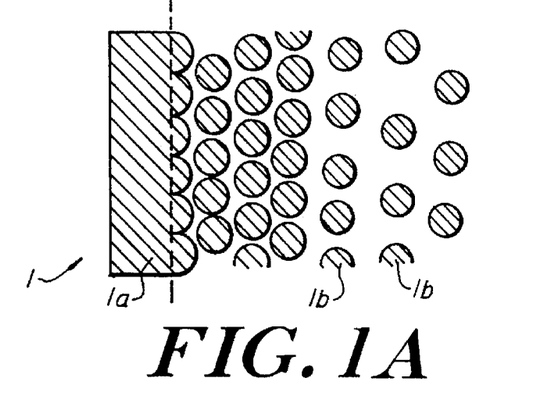
FIG. 1A is a view showing an exemplary pattern for a photomask to be used in the fabrication of a ferroelectric liquid crystal display device according to the present invention.
Figure 1B:
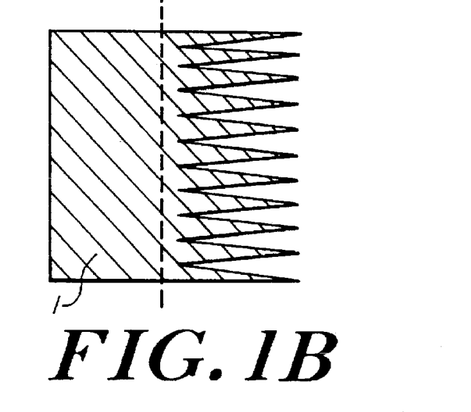
FIG. 1B is a view showing another exemplary pattern for a photomask to be used in the fabrication of a ferroelectric liquid crystal display device according to the present invention.

FIGS. 1A and 1B show, respectively, a first exemplary photomask and a second exemplary photomask. In both figures, the hatched portion denotes a weakly-irradiated portion (i.e. a portion in which the UV-rays are interrupted), while a dotted line denotes a boundary of a pixel region (i.e. a region where, in the case of a simple matrix type display device, the electrodes provided on the opposing substrates intersect each other). A portion on the left of the dotted line of each figure denotes a pixel region. In the first example, as is shown in FIG. 1A, a photomask 1 has a pattern composed of a region 1a corresponding to one pixel region and dots 1b each having a diameter of a few μm or less. The dots 1b are formed at a relatively large density near the region 1a, the density gradually decreasing away from the region 1a. In the second example, as is shown in FIG. 1B, an edge portion of a photomask 1 consists of a plurality of wedges disposed side by side, thus forming steep convex and concave portions.

According to a study conducted by the inventors of the present invention, it is preferable that the size of each portion of the light regulator for forming a weakly-irradiated region (hereinafter, such a portion will be referred to as a "masking portion") accounts for 10% or more of the area of each pixel. If the size of each masking portion of the light regulator is less than 10% of the area of each pixel, the area of a resultant liquid crystal droplet is also less than 10% of the area of each pixel. In other words, a large area in the pixel is occupied by the ferroelectric liquid crystalline polymer, inevitably decreasing the response speed of the display device. Moreover, the total area of interfaces between liquid crystal droplets and the ferroelectric liquid crystalline polymer becomes large, so that the degree of scattering of light at the interfaces becomes large, greatly decreasing the contrast of the display device.

Each masking portion can have any shape as long as the intensity of the UV-ray is locally lowered in 10% or more of the area of each pixel region. For example, the configuration of each masking portion can be a circle, a rectangle, a hexagon, a letter, or a shape surrounded by a curved line(s) and/or a straight line(s). A configuration obtained by cutting a part off these shapes, a configuration obtained by combining different shapes, a configuration obtained by combining the same shape, and the like can also be used. Moreover, masking portions do not need to be independent from one another, but can be connected to one another at an end portion, as long as portions interrupting the UV-rays most effectively have one or more of the above-mentioned configurations and/or arrangements.

UV-rays to be used should preferably be parallel rays so that the irradiation is uniformly conducted. However, it is also possible to deliberately use UV-rays with a slightly poorer degree of parallelism, since use of UV-rays with a slightly poor degree of parallelism results in generation of smaller liquid crystal droplets, which can serve as buffers at the periphery of each ferroelectric liquid crystal droplet having substantially the same size as that of a pixel. As a result, the shock resistance of the display device can be further improved. Instead of using UV-rays with a slightly poorer degree of parallelism, a light regulator (such as a photomask) having a blurred end portion, such as the photomasks shown in FIGS. 1A and 1B, can suitably be used. The same effect can be achieved by deliberately placing a photomask, etc. at a small distance from the mixture.

As for ferroelectric liquid crystal to be used in the present invention, those which are of a straight chain molecular structure, having a stiff core and an optically active portion within each molecule, can be used. By adding a multichroic dye to such a ferroelectric liquid crystal material, a guest-host type liquid crystal display device can be obtained; by using such a guest-host type liquid crystal display device along with a polarizer, a liquid crystal capable of multicolor display can be realized.

As for the ferroelectric liquid crystal prepolymer to be used in the present invention, a compound in which a polymerizable functional group is combined with a portion of ferroelectric liquid crystal can be used. Suitable examples of polymerizable functional groups are acryloyl, methacryloyl, and epoxy (glycidyl) groups. Examples of such ferroelectric liquid crystal prepolymers are disclosed in Japanese Laid-Open Patent Publication Nos. 63-280742, 62-277412 and 63-264629, which are represented by, respectively, the following Formulae I, II and III:

Formula I

Formula II

Formula III

In Formulae I, II and III, $R_1$ and $R_2$ represent side chains represented by Formula IV:

Formula IV

Furthermore, a non-liquid-crystalline polymerizable compound may be added to the liquid crystal material, in order to enhance the strength of the display device, unless it undermines the response speed thereof. Examples of such polymerizable compounds are an acrylic acid and an acrylic acid ester having a benzene ring or a long-chain alkyl group having three or more carbons.

More specifically, isobutyl acrylate, stearyl acrylate, lauryl acrylate, isoamyl acrylate, n-butylmethacrylate, n-lauryl methacrylate, tridecyl methacrylate, 2-ethylhexyl acrylate, n-stearyl methacrylate, cyclohexyl methacrylate, benzyl methacrylate, 2-phenoxyethyl methacrylate, isobornyl acrylate, and isobornyl methacrylate, and the like can be used.

In order to increase the physical strength of the resultant polymer, multi-functional compounds having two or more functional groups, such as bisphenol A dimethacrylate, bisphenol A diacrylate, 1,4-butanediol dimethacrylate, 1,6-hexanediol dimethacrylate, trimethylol propane trimethacrylate, trimethylol propane triacrylate, tetramethy-lolmethane tetraacrylate, and neopentyl diacrylate (R-684, manufactured by Nippon Kayaku K.K.), can be used.

More preferably, compounds obtained by halogenating, in particular by chlorinating or fluorinating, some of the above-mentioned monomers can be used. Examples of such compounds include 2,2,3,4,4,4-hexafluorobutyl methacrylate; 2,2,3,4,4,4-hexachlorobutyl methacrylate; 2,2,3,3-tetrafluoropropyl methacrylate; 2,2,3,3-tetrachloropropyl methacrylate; perfluorooctylethyl methacrylate; perchlorooctylethyl methacrylate; perfluorooctylethyl acrylate; and perchlorooctylethyl acrylate.

A thermosetting liquid crystal prepolymer in which a thermosetting functional group is combined with a portion of ferroelectric liquid crystal can also be suitably used in the present invention. Hereinafter, a method for fabricating a display device according to the present invention, in which such a thermosetting liquid crystal prepolymer is used, will be described.

First, a pair of substrates provided with electrodes are fabricated, as was described earlier. At least one of the substrates is patterned by photolithography with the use of a resist material including a heat-polymerization initiator. The patterning is conducted so as to leave the resist material in portions of the substrate(s) where polymer walls are intended to be formed.

A cell is formed using the patterned substrates thus obtained. Then, a mixture of a ferroelectric and a thermosetting liquid crystal prepolymer is injected into the cell; thus, a liquid crystal cell is obtained. When the liquid crystal cell is heated, polymerization starts in the vicinity of the remaining resist material owing to the heat-polymerization initiator included therein. In such regions where heat-polymerization has started, the thermosetting liquid crystal prepolymer gathers owing to a concentration gradient, so that polymer walls are formed where the resist material is remaining, and liquid crystal concentrates where no resist material is remaining. Thus, the liquid crystal display device according to the present invention has been formed.

Furthermore, as in the case where a photosetting liquid crystal prepolymer is used, a non-liquid-crystalline thermosetting compound may be added to the liquid crystal material, in order to enhance the strength of the display device, unless it undermines the response speed thereof.

Examples of such thermosetting compounds are compounds having an epoxy (glycidyl) group, an isocyanate group, and the like. More specifically, bisphenol A type epoxy resin, bisphenol A diglycidylether, bisphenol F diglycidylether, hexahydroxybisphenol A glycidylether, propyleneglycol diglycidylether, neopentylglycol diglycidylether, phthalic acid diglycidylester, triglycidylisocyanate, tetraglycidylmetaxylenediamine, and the like can be used.

As for the heat-polymerization initiator, peroxide-type compounds such as BPO (benzoyl peroxide), t-butyl peroxide, azo-type compounds such as AIBN (azobisisobutyronitrile), and the like can be suitably used.

Hereinafter, the present invention will be described by way of examples, with reference to the accompanying drawings.

EXAMPLE 1

Figure 2:
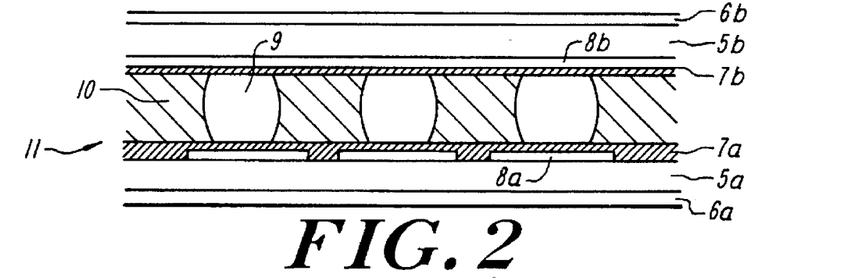
FIG. 2 is a schematic view showing a cross section of a liquid crystal display device according to a first example of the present invention.

FIG. 2 shows a cross section of a ferroelectric liquid crystal display device according to the present invention. As is shown in FIG. 2, the ferroelectric liquid crystal display device includes a liquid crystal cell composed of a pair of opposing glass substrates 5a and 5b, and a liquid crystal layer 11 interposed therebetween. A plurality of electrode strips 8a are provided in parallel on the inside face of the glass substrate 5a. A plurality of electrode strips 8b are provided in parallel on the inside face of the glass substrate 5b. Each electrode strip 8a is disposed perpendicular to each electrode strip 8b. The liquid crystal layer 11 is so configured that ferroelectric liquid crystal droplets 9 are partitioned by a wall of ferroelectric liquid crystalline polymer 10. On the electrode strips 8a is provided an aligning film 7a. On the electrode strip 8b is provided an aligning film 7b. Polarizing plates 6a and 6b are provided on, respectively, an outer face of the substrate 5a and an outer face of the substrate 5b.

The above-mentioned liquid crystal cell is fabricated in the following manner:

First, an ITO (mixture of an indium oxide and a tin oxide) film (thickness: 50 nm) is formed on each of the pair of substrates 5a and 5b (7059, manufactured by Corning Co.) (thickness: 1.1 mm) and is patterned to form 20 electrode strips 8a and 20 electrode strips 8b. The electrode strips 8a and 8b each have a width of 200 μm, and are formed at a distance of 50 μm from one another.

Next, polyimide (SE150, manufactured by Nissan Chemical Industries Ltd.) is applied on the inside faces of the substrates 5a and 5b (where the electrode strips 8a and 8b are formed) by a spin coating method to form the aligning films 7a and 7b, respectively. A rubbing treatment is conducted for each of the substrates 5a and 5b in one direction, by the use of a nylon cloth. Other suitable orientation methods are a vertical orientation method in which a compound having a low surface tension is applied to the substrates, and a diagonal orientation method in which materials such as $SiO_2$ is diagonally deposited on the substrates. The rubbing for one substrate 5a (5b) should be conducted in a direction (hereinafter referred to as a 'rubbing direction') parallel to a direction in which the electrode strips 8a (8b) are formed. The rubbing for the other substrate 5b (5a) should be conducted in a direction (rubbing direction) perpendicular to the direction in which the electrode strips 8b (8a) are formed. After the rubbing treatment, the substrates 5a and 5b are disposed with their inside faces (i.e. the faces on which the electrode strips 8a and 8b are formed) facing each other in such a way that each electrode strip 8a is perpendicular to each electrode strip 8b. Thus, the rubbing directions for the substrates 5a and 5b, when assembled, are made identical.

Subsequently, spacers are interposed between the substrates 5a and 5b so as to create an interspace therebetween. The interspace, which is equivalent to the width of the liquid crystal layer 11, should be within the range of 1 to 5 μm so that liquid crystal molecules retain a uniform orientation (a layer-like structure obtained by disentangling the spiral of liquid crystal at a smectic C* phase). Preferably, the interspace should be in the range of 1 to 3 μm. In the present example, spacers each having a length of 2 μm are used. Thus, a cell has been fabricated.

Figure 3:
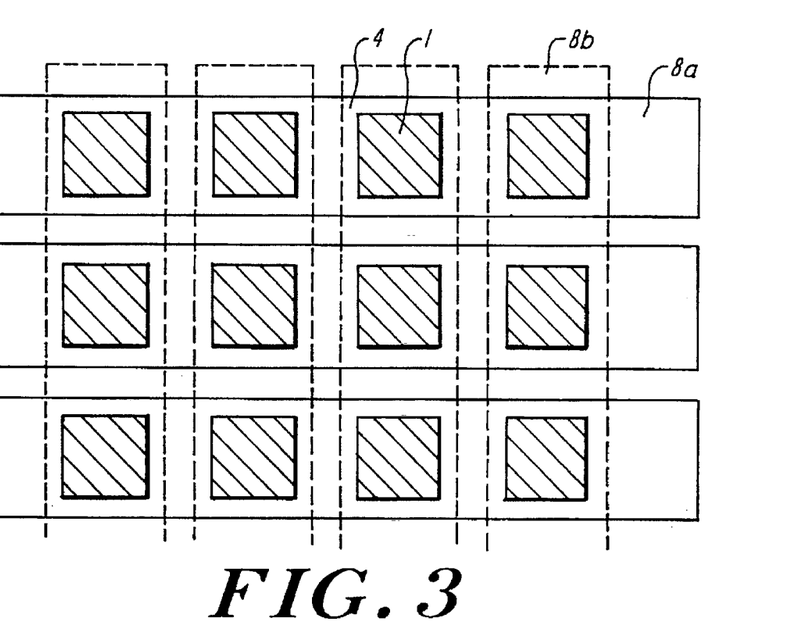
FIG. 3 is a view showing a schematic view showing an exemplary combination of a photomask and a cell according to a first example of the present invention.

FIG. 3 is a plan view showing a configuration for the cell of the present example obtained in the above-mentioned manner and a photomask 1. As is seen from FIG. 3, pixels 4 are formed in intersections of the electrode strips 8a (disposed on the inside face of the substrate 5a) and the electrode strips 8b (disposed on the inside face of the substrate 5b). The photomask 1 having a pattern which satisfies the earlier-mentioned conditions is placed on the outside face of one substrate 5a (5b) of the cell so as to correspond to the pitch of the pixels 4 and so as to shade the pixels 4.

Next, a homogeneous mixture containing 0.7 g of a ferroelectric liquid crystal composition (ZLI-4003, manufactured by Merck & Co., Inc.), 0.2 g of a ferroelectric liquid crystal prepolymer represented by Formula V (shown below), 0.1 g of trimethylol propane triacrylate, 0.01 g of 2-ethylhexyl acrylate, and 0.01 g of a photopolymerization initiator (Irgacure 651, manufactured by CIBA-GEIGY Corporation) is prepared. The mixture is injected into the cell with the photomask 1 provided thereon.

Formula V

Then, the cell is irradiated for 4 minutes with parallel UV-rays through the substrate 5a (5b) on which the photomask 1 is provided, so as to cure the ferroelectric liquid crystal prepolymer containing a photopolymerizable functional group. A high-pressure mercury lamp is used at an illuminance of 10 mW/cm² for obtaining the UV-rays. After the polymerization of the ferroelectric liquid crystal prepolymer, the photomask 1 is removed from the cell.

On observing the liquid crystal cell using a polarization microscope, it was confirmed that the ferroelectric liquid crystal droplets 9 (shown in FIG. 2) had been uniformly formed as regions having a different texture from the other regions. The ferroelectric liquid crystal droplets 9 were of a substantially equal size, and had substantially the same regularity as that of the dot pattern of the photomask 1, that is, the same regularity as that of the pixels 4 (shown in FIG. 3).

The liquid crystal cell is furnished with the polarizers 6a and 6b, which are disposed in a cross-Nicol state, to form the display device of the present example.

Figure 4A:
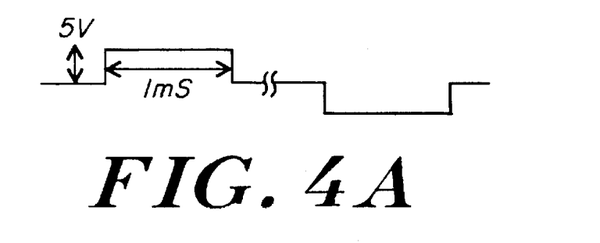
FIG. 4A is a view showing the waveform of a memory pulse to be applied to a cell in a first example of the present invention.
Figure 4B:
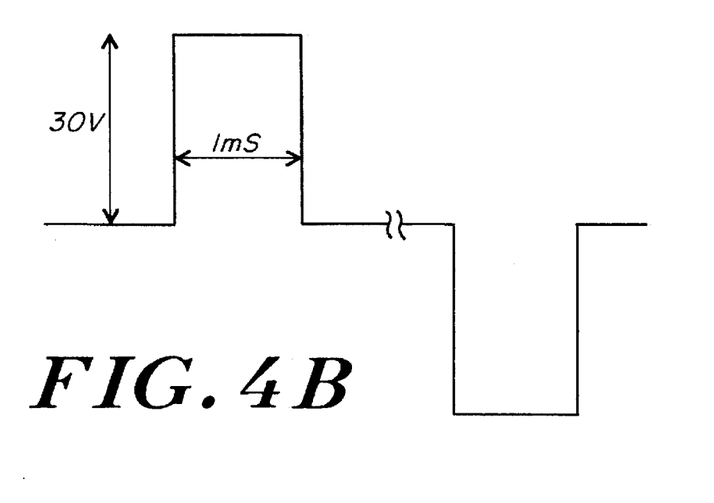
FIG. 4B is a view showing the waveform of a memory pulse to be applied to a cell in a first example of the present invention.

Two kinds of memory pulses, shown in FIGS. 4A and 4B, are applied to the display device. The memory pulse shown in FIG. 4A has a pulse width of 1 ms and a peak value of 5 V; the memory pulse shown in FIG. 4B has a pulse width of 1 ms and a peak value of 30 V. Results of such a test showed that the state of the whole pixels 4 switched corresponding to the 30 V-memory pulse, while the state of only a portion of each pixel 4 which consists mainly of the ferroelectric liquid crystal switched on corresponding to the 5 V-memory pulse. Table 1 shows contrast characteristics of the display device according to the above test. As is seen from Table 1, the display device has different contrasts depending on whether a 5 V-memory pulse or a 30 V-memory pulse is applied thereto. Therefore, the display device of the present invention is capable of displaying in two gray scales.

TABLE 1

| driving voltage | 5 V | 30 V |
| --- | --- | --- |
| contrast | 15 | 32 |

As a shock resistance test, a pressure of 5 kg/cm² was applied to an area measuring 1 cm² in the substrate 5a (5b) of the liquid crystal cell according to the present example to see how the orientation of the liquid crystal changes. Results of the test are described in Table 2 (shown below). As is seen from Table 2, no disorientation was found in the cell of the present example, which is proof of the high shock resistance of the cell.

Although the cell of the present example is of a simple matrix type, it is also possible to configure the cell as an active matrix type cell in which TFT (Thin Film Transistors), MIMs (Metal-Insulator-Metals) and the like are used.

COMPARATIVE EXAMPLE 1

A ferroelectric liquid crystal cell was fabricated by injecting the ferroelectric liquid crystal composition (ZLI-4003, manufactured by Merck & Co., Inc.) alone into the same cell as that of Example 1. As a shock resistance test, a pressure of 5 kg/cm$^2$ was applied to an area measuring 1 cm$^2$ in one substrate of the cell to see how the orientation of the liquid crystal changes. Results of the test are described in Table 2. As is seen from Table 2, some disorientation was found in the ferroelectric liquid crystal cell of r was composed only of the ferroelectric liquid crystal has poor shock resistance.

TABLE 2

|  | Example 1 | Comparative Example 1 |
|---|---|---|
| state of cell | normal | some disorientation |

EXAMPLE 2

Figure 5:
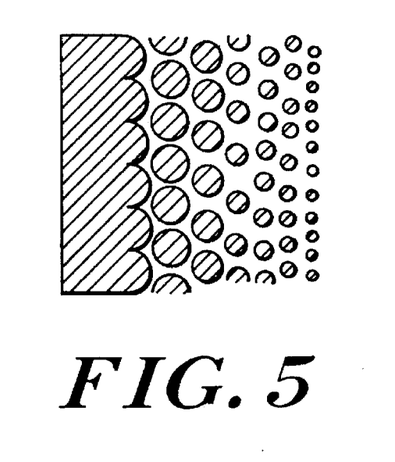
FIG. 5 is a view showing a pattern for a photomask used in the fabrication of a display device according to a second example of the present invention.

A ferroelectric liquid crystal cell similar to that of Example 1 was fabricated using a cell having the same configuration as that of the cell of Example 1 and the same mixture as that of Example 1. The ferroelectric liquid crystal cell was fabricated in the same manner as in Example 1 except a photomask shown in FIG. 5 was used. Four kinds of memory pulses having peak values of, respectively, 5 V, 12 V, 23 V, and 30 V were applied to the ferroelectric liquid crystal cell of the present example. Table 3 shows contrast characteristics of the display device according to the above test. As is seen from Table 3, the display device has different contrasts depending on the particular kind of memory pulse applied thereto. Therefore, the display device of the present invention is capable of displaying in gray scales.

TABLE 3

| driving voltage | 5 V | 12 V | 23 V | 30 V |
|---|---|---|---|---|
| contrast | 5 | 13 | 21 | 30 |

As a shock resistance test, a pressure of 5 kg/cm$^2$ was applied to an area measuring 1 cm$^2$ in the substrate of the liquid crystal cell according to the present example to see how the orientation of the liquid crystal changes. Results of the test revealed that no disorientation was found in the cell of the present example, which is proof of the high shock resistance of the cell.

As has been described, according to the present example, there is provided a ferroelectric liquid crystal display device capable of displaying with a high contrast and having high shock resistance while maintaining high response speed as one property inherent to ferroelectric liquid crystal. Moreover, a ferroelectric liquid crystal display device according to the present invention is capable of displaying in gray scales.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A ferroelectric liquid crystal display device comprising:
   a pair of substrates disposed so as to oppose each other, at least one of the pair of substrates being transparent;
   electrodes formed on an inside face of each of the pair of substrates;
   a display medium for displaying an image, the display medium being divided into at least one liquid crystal region composed essentially of ferroelectric liquid crystal and a polymer region composed essentially of liquid crystalline polymer, and the display medium being controlled by applying a voltage to the electrodes, and
   a plurality of pixels, wherein at least one liquid crystal region is formed corresponding to the pixels,
   wherein a longest liquid crystal region diameter, in a plane parallel to the pair of substrates, is larger than a distance between the pair of substrates.

2. A ferroelectric liquid crystal display device comprising:
   a pair of substrates disposed so as to oppose each other, at least one of the pair of substrates being transparent;
   electrodes formed on an inside face of each of the pair of substrates; and
   a display medium for displaying an image, the display medium being divided into at least one liquid crystal region composed essentially of ferroelectric liquid crystal and a polymer region composed essentially of liquid crystalline polymer, and the display medium being controlled by applying a voltage to the electrodes,
   wherein the liquid crystalline polymer includes at least one ferroelectric liquid crystal polymer unit, and
   wherein a component ratio between ferroelectric liquid crystal and ferroelectric liquid crystalline polymer gradually changes in the vicinity of an interface between the at least one liquid crystal region and the polymer region, the component ratio changing in a direction parallel to the pair of substrates.

3. A method for producing a ferroelectric liquid crystal display device comprising the steps of:
   forming electrodes on each of a pair of substrates, at least one of the pair of substrates being transparent;
   forming an aligning film on the electrodes formed on at least one of the pair of substrates;
   subjecting the aligning film to a rubbing treatment;
   disposing the pair of Substrates in such a way that the electrodes formed on one of the pair of substrates oppose the electrodes formed on the other substrate, a space being interposed between the pair of substrates;
   disposing light regulating means for modulating light intensity on the pair of substrates in such a way that portions of the pair of substrates which water become display pixels are shaded by the light regulating means;
   injecting a mixture of a polymer precursor having a photopolymerizable functional group and ferroelectric liquid crystal having no photopolymerizable functional group;
   irradiating the pair of substrates with a UV-ray through the light regulating means; and
   removing the light regulating means,
   wherein the irradiation with a UV-ray is conducted for all of the display pixels in such a way that the intensity of the UV-ray is decreased in a portion of each display pixel accounting for at least 10% or more of the area of each display pixel and that the intensity of the UV-ray is decreased by 50% or more in at least a portion of the portion of the display pixel accounting for at least 10% or more of each display pixel.

4. A method for producing a ferroelectric liquid crystal display device comprising the steps of:

forming electrodes on each of a pair of substrates, at least one of the pair of substrates being transparent;

forming an aligning film on the electrodes formed on at least one of the pair of substrates;

subjecting the aligning film to a rubbing treatment;

disposing the pair of substrates in such a way that the electrodes formed on one of the pair of substrates oppose the electrodes formed on the other substrates, a space being interposed between the pair of substrates;

disposing light regulating means for modulating light intensity On the pair of Substrates in such a way that portions of the pair of substrates which later become display pixels are shaded by the light regulating means;

injecting a mixture of a polymer precursor having a photopolymerizable functional group and ferroelectric liquid crystal having no photopolymerizable functional group;

irradiating the pair of substrates with a UV-ray through the light regulating means; and removing the light regulating means, wherein the light regulating means is a photomask having a regular pattern for shading at least 10% or more of the area of each display pixel, and wherein the irradiation with a UV-ray is conducted through the photomask.

5. A method for producing a ferroelectric liquid crystal display device comprising the steps of:

forming electrodes on each of a pair of substrates, at least one of the pair of substrates being transparent;

forming an aligning film on the electrodes formed on at least one of the pair of substrates;

subjecting the aligning film to a rubbing treatment;

disposing the pair of substrates in such a way that the electrodes formed on one of the pair of substrates oppose the electrodes formed on the other substrate, a space being interposed between the pair of substrates;

disposing light regulating means for modulating light intensity on the pair of substrates in such a way that portions of the pair of substrates which later become display pixels are shaded by the light regulating means;

injecting a mixture of a polymer precursor having a photopolymerizable functional group and ferroelectric liquid crystal having no photopolymerizable functional group;

irradiating the pair of substrates with a UV-ray through the light regulating means; and removing the light regulating means, wherein the photomask is formed in an integral manner with one of the pair of substrates and the irradiation with a UV-ray is conducted through the photomask.

6. A method for producing a ferroelectric liquid crystal display device comprising the steps of:

forming electrodes on each of a pair of substrates, at least one of the pair of substrates being transparent;

forming an aligning film on the electrodes formed on at least one of the pair of substrates;

subjecting the aligning film to a rubbing treatment;

patterning a heat-polymerization initiator on at least one of the pair of the substrates;

disposing the pair of substrates in such a way that the electrodes formed on one of the pair of substrates oppose the electrodes formed on the other substrate, a space being interposed between the pair of substrates;

injecting a mixture of a ferroelectric liquid crystal polymer precursor having a thermosetting functional group and ferroelectric liquid crystal having no thermosetting functional group; and curing the ferroelectric liquid crystal having the thermosetting functional group by heating the pair of substrates.

* * * * *